C. G. SIMON, DEC'D.
G. OLSON, ADMINISTRATOR.
REFRIGERATOR.
APPLICATION FILED APR. 1, 1912. RENEWED JAN. 11, 1915.
1,156,252.
Patented Oct. 12, 1915.
Fig. 1
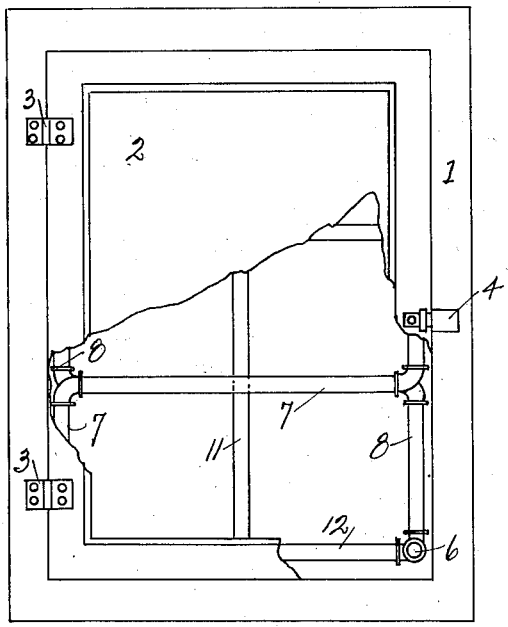
Fig. 2.
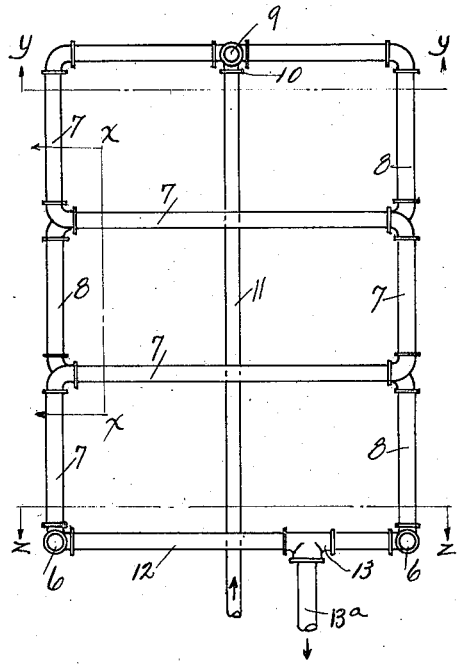
Fig. 3.
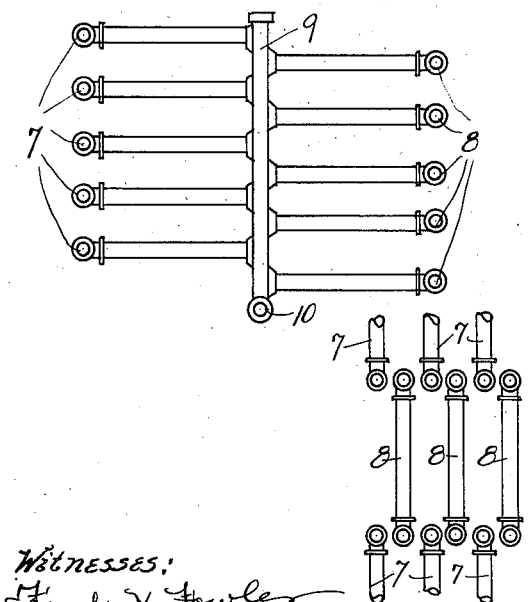
Fig. 5.
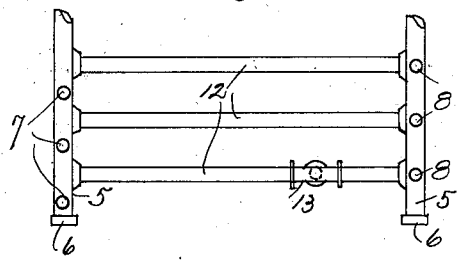
Fig. 4.
Witnesses:
Frank H. Fowler
Frances L. Fowler
Inventor
Carl G. Simon
by Fred P. Goin
Attorney.

UNITED STATES PATENT OFFICE.

CARL G. SIMON, OF SEATTLE, WASHINGTON; GEORGE OLSON, ADMINISTRATOR OF SAID SIMON, DECEASED, ASSIGNOR TO L. H. MARKHAM AND C. E. TAYLOR, OF KING COUNTY, WASHINGTON.

REFRIGERATOR.

1,156,252.   Specification of Letters Patent.   Patented Oct. 12, 1915.

Application filed April 1, 1912, Serial No. 687,851.   Renewed January 11, 1915.   Serial No. 1,721.

*To all whom it may concern:*

Be it known that I, CARL G. SIMON, a citizen of the United States, and a resident of Seattle, in the county of King and State of Washington, have invented certain new and useful Improvements in Refrigerators, of which the following is a full, true, and exact specification.

The principal object of this invention is to provide a simple and inexpensive but efficient device, especially adapted to domestic use, which is constantly kept sufficiently cool for the purpose by the movement of the water in the pipes of an ordinary municipal water system.

An important feature of the invention is the arrangement of the pipes within the refrigerator whereby they in themselves form shelves upon which the food or other material is placed so as to directly contact with the cooled pipes.

The invention will be fully described in the following specification and shown in the accompanying drawings, in which—

Figure 1 is a front view of the device with a portion of the door of the chest broken away. Fig. 2 is a similar view of the pipe arrangement. Fig. 3 is a cross sectional view upon the line $y$—$y$ of Fig. 2. Fig. 4 is a fragmentary sectional view of a portion of the pipes upon the line X—X of Fig. 2, looking in the direction of the small arrows connected to that line. Fig. 5 is a fragmentary sectional view of the bottom pipes, upon the line $z$—$z$ of Fig. 2.

Referring more particularly to the drawings, reference character 1 designates a chest, having the door 2, hinges 3 and latch 4, the walls of which may be of the usual construction of an ordinary ice box; no particular description of the same is here given as the chest itself forms no part of this invention. Fitting into the two lower corners of the chest 1 are the pipes 5 which are capped at 6, and from which rise the series of pipes 7, upon one side of the chest, and the series of pipes 8 upon the other side thereof. The pipes 7 and 8 follow a serpentine course, as shown in Fig. 2, and for this reason each of the pipes 7 is in a different vertical plane from any of the pipes 8, as shown in Figs. 3, 4 and 5, so that their horizontal portions lie close to each other in the same plane and form shelves, as will be understood. At the top is the central pipe 9 to which are connected the pipes 7 and 8, and which is connected by the elbow 10 to the water inlet pipe 11. The pipes 5 are connected to each other by the cross pipes 12, one of which may be in two parts and joined by the union 13 from which extends the water outlet pipe 13ª. The inlet pipe 9 communicates with the head or pressure pipe of an ordinary city water system, and the outlet pipe 13ª communicates with the usual water faucets in the building.

From the foregoing it is believed that the construction and operation of my device will be clear to others skilled in the art. It is clear that I have provided a shelf forming arrangement of pipes which may be readily fitted into a chest for the purpose mentioned, and connected to an ordinary city water system; that the food, or other perishable substance, may rest directly upon the cooled pipes, and is surrounded by the same; that, as water is drawn from the faucets for common use, a movement of all the water within the pipes contained within the chest is thereby caused with a resultant cooling of the pipes.

While I have shown a particular form of embodiment of my invention, I am aware that many changes therein will readily suggest themselves to others, without departing from the spirit and scope thereof, and I do not therefore desire to be limited to the exact form shown and described.

Having described my invention, what I claim as new and desire to protect by Letters Patent is—

A refrigerator comprising in combination, a chest, an arrangement of pipes removably mounted within the same, comprising an inlet and an outlet pipe; a pair of horizontal pipes, communicating with the outlet pipe, and a series of vertical pipes connected to the horizontal pipes in staggered relation to each other at their lower ends and bent so as to form shelves, and connected at their upper ends with a horizontal pipe communicating with the inlet pipe.

CARL G. SIMON.

Witnesses:
FRED P. GORIN,
H. RUPERT.